United States Patent
Bier

(10) Patent No.: US 10,430,970 B2
(45) Date of Patent: Oct. 1, 2019

(54) DETECTION AND RECALIBRATION FOR A CAMERA SYSTEM USING LIDAR DATA

(71) Applicant: GM GLOBAL TECHNOLOGY OPERATIONS LLC, Detroit, MI (US)

(72) Inventor: Solomon Bier, San Francisco, CA (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 29 days.

(21) Appl. No.: 15/830,148

(22) Filed: Dec. 4, 2017

(65) Prior Publication Data

US 2018/0096493 A1   Apr. 5, 2018

(51) Int. Cl.
| | |
|---|---|
| G06T 7/80 | (2017.01) |
| G01S 17/02 | (2006.01) |
| G01S 17/93 | (2006.01) |
| G01S 17/89 | (2006.01) |
| G01S 7/48 | (2006.01) |
| G05D 1/02 | (2006.01) |
| G05D 1/00 | (2006.01) |
| G01S 17/10 | (2006.01) |

(52) U.S. Cl.
CPC ............ *G06T 7/80* (2017.01); *G01S 7/4808* (2013.01); *G01S 17/023* (2013.01); *G01S 17/89* (2013.01); *G01S 17/936* (2013.01); G01S 17/10 (2013.01); G05D 1/0088 (2013.01); *G05D 1/0248* (2013.01); *G06T 2207/10028* (2013.01); *G06T 2207/30252* (2013.01)

(58) Field of Classification Search
CPC ....... G06T 7/80; G01S 7/4808; G01S 17/023; G01S 17/89; G01S 17/936; G01S 17/10; G05D 1/0088; G05D 1/0248
USPC .......................................................... 701/30.7
See application file for complete search history.

(56) References Cited

U.S. PATENT DOCUMENTS

| | | | |
|---|---|---|---|
| 8,139,109 B2 * | 3/2012 | Schmiedel ............ | G01S 17/023 348/118 |
| 9,201,424 B1 * | 12/2015 | Ogale ....................... | G06T 7/80 |
| 9,494,940 B1 * | 11/2016 | Kentley ................ | B60N 2/002 |
| 2010/0235129 A1 * | 9/2010 | Sharma ................. | G01S 7/4972 702/97 |

* cited by examiner

*Primary Examiner* — Gertrude Arthur Jeanglaude
(74) *Attorney, Agent, or Firm* — Lorenz & Kopf, LLP

(57) ABSTRACT

Systems and method are provided for calibrating a camera system of an autonomous vehicle. In one embodiment, a method includes: identifying, by the processor, a planar object from sensor data generated by a sensor of the autonomous vehicle while the autonomous vehicle is operating; identifying, by the processor, a pattern of the planar object; selecting, by the processor, planar points from the pattern of the planar object; and calibrating, by the processor, the camera system, while the autonomous vehicle is operating, based on the planar points.

19 Claims, 6 Drawing Sheets

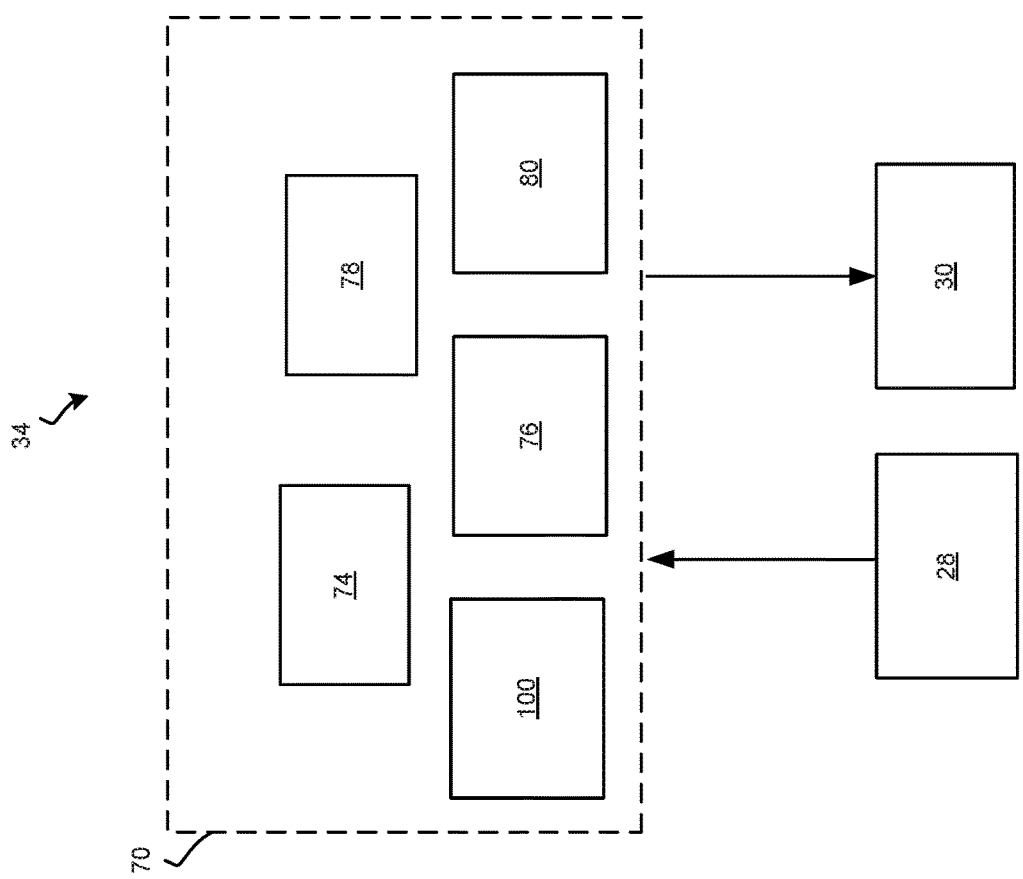

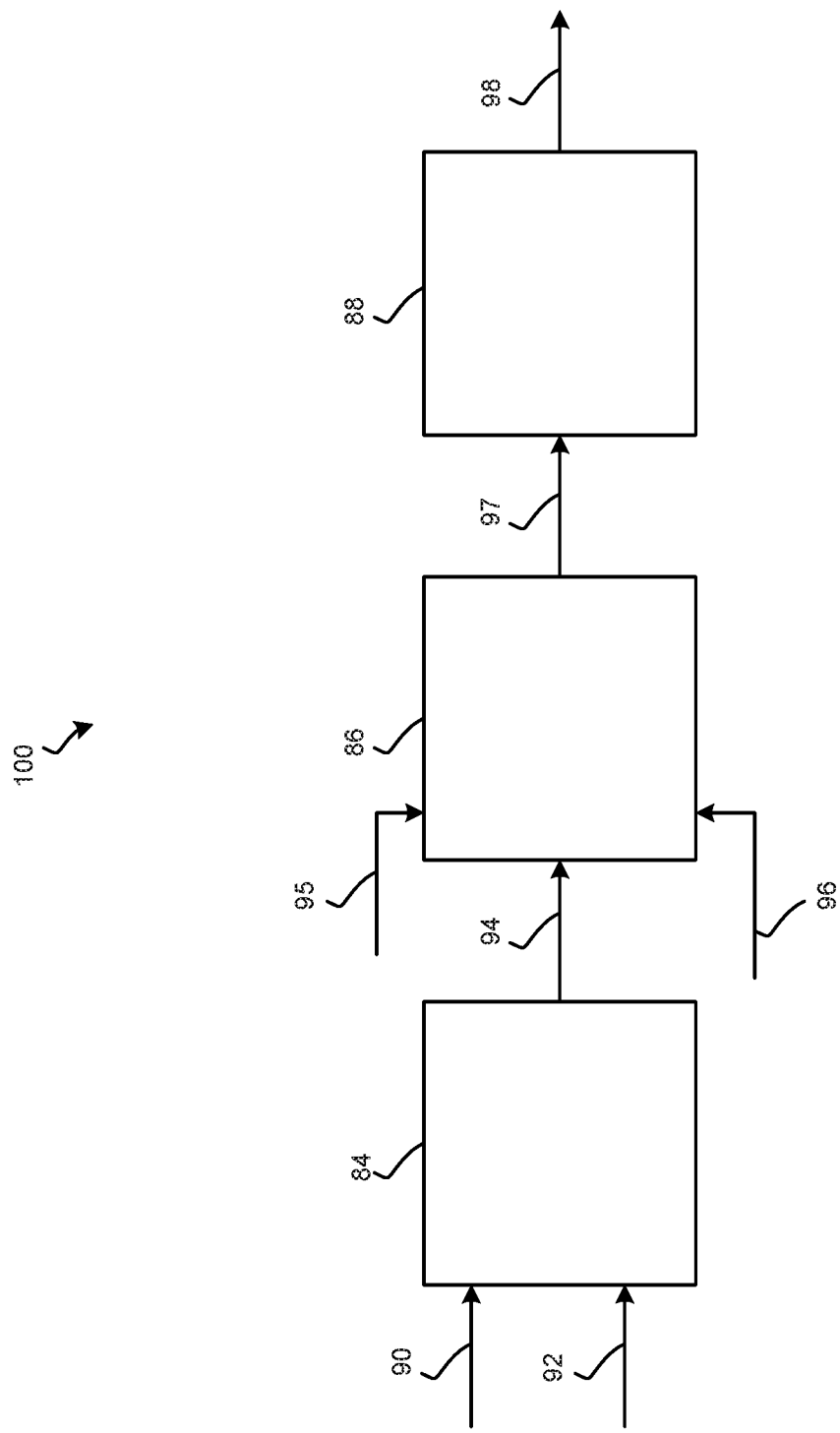

DETECTION AND RECALIBRATION FOR A CAMERA SYSTEM USING LIDAR DATA

INTRODUCTION

The present disclosure generally relates to autonomous vehicles, and more particularly relates to systems and methods for detecting and correcting faults in a camera system of an autonomous vehicle.

An autonomous vehicle is a vehicle that is capable of sensing its environment and navigating with little or no user input. An autonomous vehicle senses its environment using sensing devices such as radar, lidar, image sensors such as cameras, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

While recent years have seen significant advancements in autonomous vehicle systems, such systems might still be improved in a number of respects. For example, image sensors are typically calibrated when installed to the vehicle and periodically thereafter during maintenance events. In both instances, the autonomous vehicle is brought offline, or not in operation, when performing the calibration.

Accordingly, it is desirable to provide systems and methods that detect in realtime when the camera is not properly calibrated. It is further desirable to provide systems and methods for recalibrating the camera system in realtime. Furthermore, other desirable features and characteristics of the present disclosure will become apparent from the subsequent detailed description and the appended claims, taken in conjunction with the accompanying drawings and the foregoing technical field and background.

SUMMARY

Systems and method are provided for calibrating a camera system of an autonomous vehicle. In one embodiment, a method includes: identifying, by the processor, a planar object from sensor data generated by a sensor of the autonomous vehicle while the autonomous vehicle is operating; identifying, by the processor, a pattern of the planar object; selecting, by the processor, planar points from the pattern of the planar object; and calibrating, by the processor, the camera system, while the autonomous vehicle is operating, based on the planar points.

In one embodiment, a system includes: a first non-transitory module that, by a processor, identifies a planar object from sensor data generated by a sensor of the autonomous vehicle while the autonomous vehicle is operating; a second non-transitory module that, by a processor, identifies a pattern of the planar object, and selects planar points from the pattern of the planar object; and a third non-transitory module that, by a processor, calibrates the camera system, while the autonomous vehicle is operating, based on the planar points.

BRIEF DESCRIPTION OF THE DRAWINGS

The exemplary embodiments will hereinafter be described in conjunction with the following drawing figures, wherein like numerals denote like elements, and wherein:

FIGS. 3 and 4 are dataflow diagrams illustrating an autonomous driving system that includes the image sensor calibration system of the autonomous vehicle, in accordance with various embodiments.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
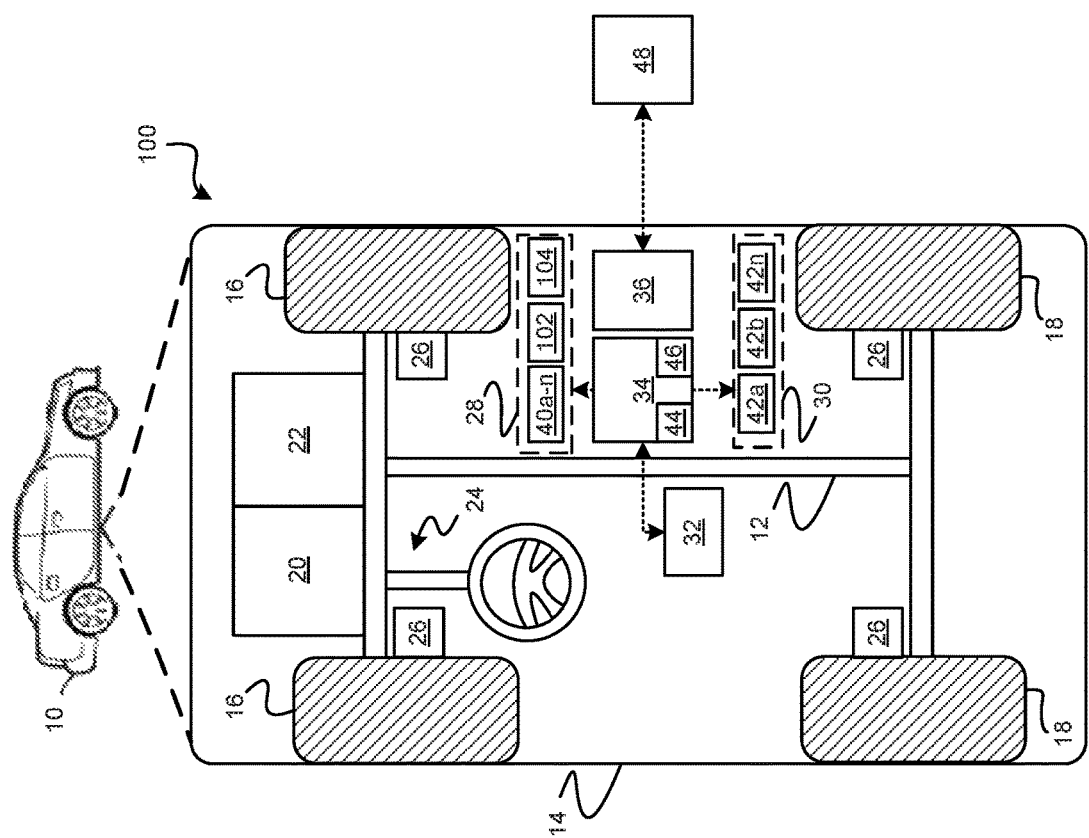
FIG. 1 is a functional block diagram illustrating an autonomous vehicle having an image sensor calibration system, in accordance with various embodiments.

With reference to FIG. 1, a calibration system shown generally at 100 is associated with a vehicle 10 in accordance with various embodiments. As will be discussed in more detail below, the calibration system 100 detects misalignment of a camera system 102 on the vehicle 10 and calibrates the camera system 102 according to the misalignment. In various embodiments, the calibration system 100 detects and recalibrates the camera system 102 in realtime with operation of the vehicle 10. In various embodiments, the calibration system 100 detects and recalibrates the camera system 102 in realtime based on lidar data from a lidar system 104 on the vehicle 10.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the calibration system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40*a*-40*n* that sense observable conditions of the exterior environment and/or the interior environment of the autonomous vehicle 10. The sensing devices 40*a*-40*n* can include, but are not limited to, radars, lidars, global positioning systems, optical cameras, thermal cameras, ultrasonic sensors, inertial measurement units, and/or other sensors. In various embodiments, the sensing devices include the camera system 102 and the lidar system 104.

The actuator system 30 includes one or more actuator devices 42*a*-42*n* that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
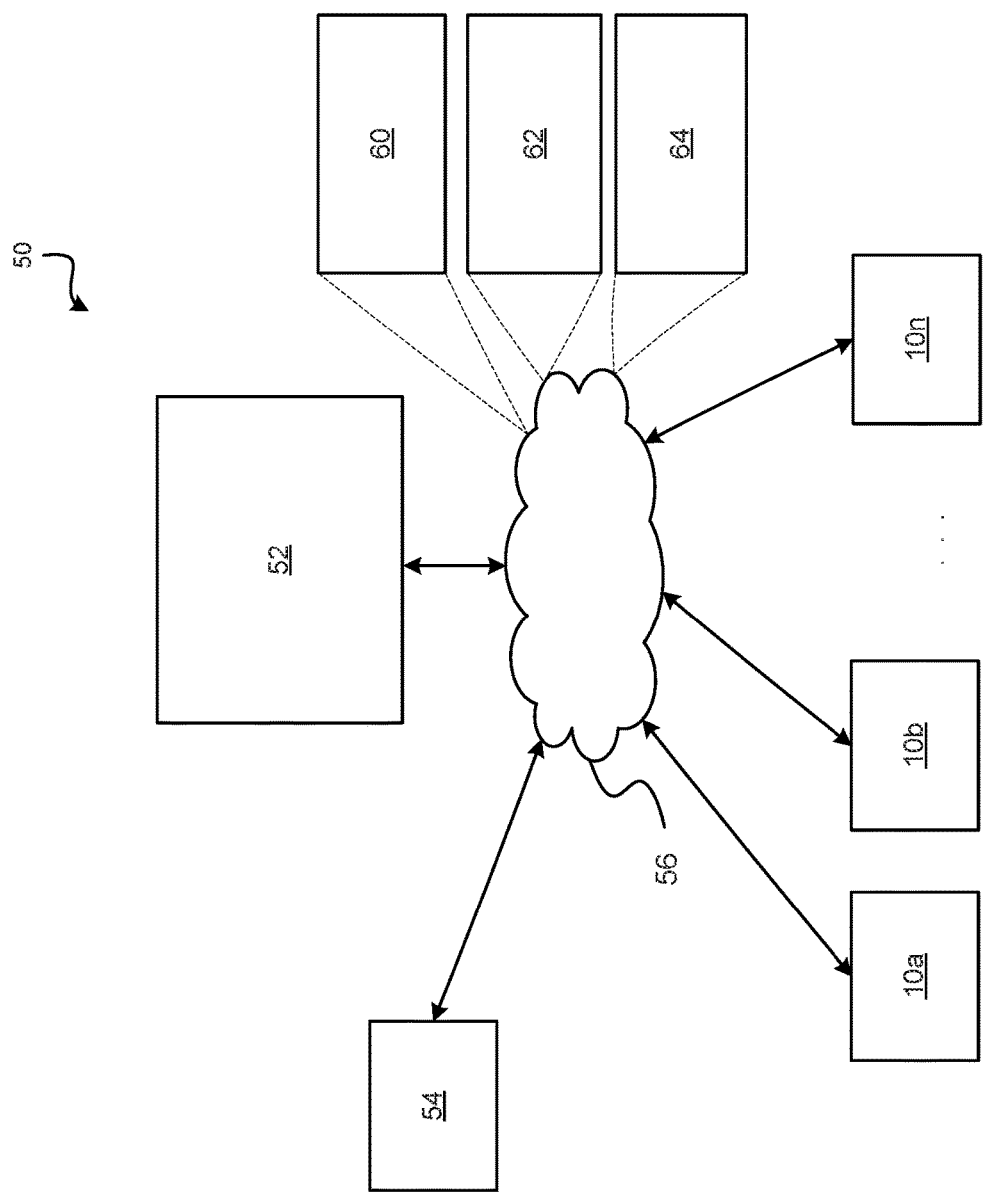
FIG. 2 is a functional block diagram illustrating a transportation system having one or more autonomous vehicles of FIG. 1, in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the calibration system 100 and, when executed by the processor 44, process data from the camera system 102 and the lidar system 104 in order to detect and recalibrate the camera system 102 in realtime with operation of the autonomous vehicle 10.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores account information such as subscriber authentication information, vehicle identifiers, profile records, behavioral patterns, and other pertinent sub scriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The remote transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

In accordance with various embodiments, the controller 34 implements an autonomous driving system (ADS) 70 as shown in FIG. 3. That is, suitable software and/or hardware components of the controller 34 (e.g., the processor 44 and the computer-readable storage device 46) are utilized to provide an autonomous driving system 70 that is used in conjunction with vehicle 10.

In various embodiments, the instructions of the autonomous driving system 70 may be organized by function, module, or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from the multiple sensors of the sensor system 28, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, parts of the calibration system 100 of FIG. 1 are included within the ADS 70, for example, as part of the computer vision system 74 or as a separate system 82 (as shown). For example, as shown in more detail with regard to FIG. 4 and with continued reference to FIGS. 1-3, the calibration system 100 includes a detection module 84, a construction module 86, and a calibration module 88. As can be appreciated, various embodiments of the calibration system 100 according to the present disclosure can include any number of sub-modules. As can be appreciated, the sub-modules shown in FIG. 4 can be combined and/or further partitioned to similarly detect an uncalibrated camera system 102 and calibrate the camera system 102.

In various embodiments, the detection module 84 processes sensor data to detect when the camera system 102 is out of alignment or calibration. In various embodiments, the detection module 84 processes image data 90 provided by the camera system 102 and lidar data 92 provided by the lidar system 104. For example, the detection module 84 processes the image data 90 to determine a location of depth discontinuities in an image frame; and processes the lidar data 92 to determine a location of intensity discontinuities in a lidar return. The detection module 84 then maps the location of the depth discontinuities in the image frame to the intensity discontinuities in the lidar frame. When deviations between the mapped depth discontinuities and the intensity discontinuities are greater than a threshold (e.g., 1 cm or other number), then the detection module 84 makes a determination that the camera system 102 is out of calibration and, for example, sets a calibration status 94 based thereon. As can be appreciated, in various embodiments, this detection process can be performed on every frame, over a series of frames, at predetermined times, continuously, and/or based on other conditions.

The construction module 86 processes sensor data 95 to determine realtime objects to be used in calibration. The realtime objects are planar objects that have perpendicular features or present a grid-like pattern, such as, but not limited to, brick walls, telephone poles carrying wires, three dimensional lidar tiles, lane boundaries or markings, or other permanent structures existing or placed in the environment.

In various embodiments, the sensor data processed by the construction module 86 includes lidar data 954 provided by the lidar system 104 and image data 96 provided by the camera system 102. For example, the construction module 86 accumulates lidar data 95 received from N number of scans (e.g., where 10, 11, 12, 13, 14, 15, or other integer value) and creates a three dimensional (3D) mesh of the data. The construction module 86 processes the 3D mesh to identify the planar objects. For example, in various embodiments, the lidar system 104 transmits laser pulses throughout the environment and measures the return pulses. The measurements are assembled into a point cloud of information including, but not limited to, values associated with distances and/or intensities. The point cloud is set to a top-down view grid image having a plurality of pixels. In various embodiments, the pixels in the image are then evaluated and grouped, for example, by computing a difference between a minimum Z value and maximum Z value at each pixel, removing outlier pixels when there is a small difference, and grouping the neighborhood pixels. The data in the groupings is further evaluated to identify objects such as buildings, vehicles, and signs surrounding the roadway as well as to identify the ground itself and to identify a direction of the groupings. In various embodiments, the planar objects can be cleaned against pre-mapped three dimensional lidar tiles, if available.

For example, one or more of the groupings is selected as the planar objects. Line features in the grouping are identified using, for example, the Hough-transform. The pitch and roll of the points related with line features in the groups are rotated in a predefined manner and the rotated points are set to a new top-down view grid image having a plurality of pixels. The number of pixels is compared to a pre-set minimum. If the number of pixels has not reached a minimum, then the pitch and roll of the points related with the line features in the groups are rotated again in a predefined manner and the rotated points are set to a new top-down view grid image having a plurality of pixels. The number of pixels is again compared to the minimum. Once the number of pixels reaches the minimum, the global facade of the group is selected as the planar object. As can be appreciated, various methods may be employed to interpret the point cloud data, group the return points into objects, and identify the planar objects in various embodiments. For exemplary purposes a single method is provided herein.

Figure 5A:
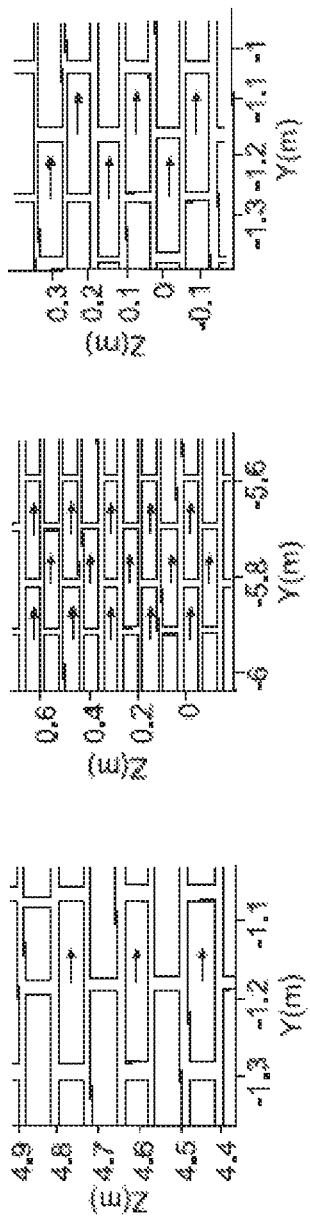
FIGS. 5A and 5B are illustrations of patterns on a planar object, in accordance with various embodiments.
Figure 5B:
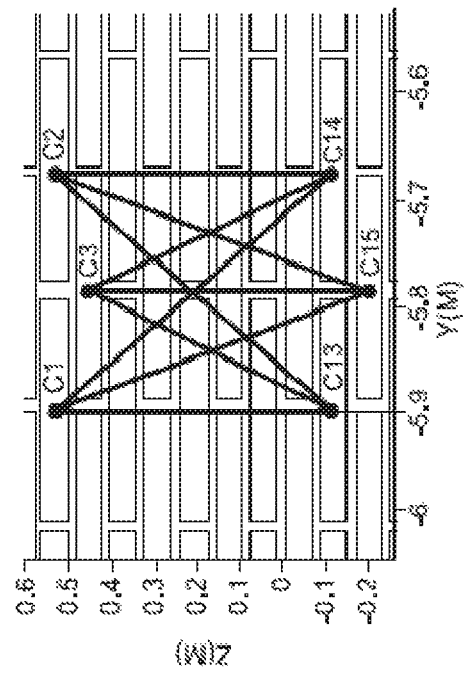

The construction module 86 then processes the planar objects for consistent changes in intensity (e.g., a pattern of intensity values). For example, the construction module 86 progresses through the data of the identified planar object from left to right or right to left and computes a gradient for each point. The gradient is then evaluated for consistent changes, or patterns of changes such as those shown in FIGS. 5A-5B, where the connector lines between C1-C3 and C13-C15 illustrate baseline changes in the X direction.

The construction module 86 then fills in any holes of the planar object identified as having the pattern. For example, the construction module 86 fills in the holes by comparing the data of the planar object to data of a predefined three dimensional map of the world (e.g., downloaded to the vehicle 10 and stored in the data storage device), by anti-aliasing techniques, and/or by any other data enhancing techniques.

The construction module 86 likewise progresses through the image data 96 from left to right or right to left (i.e., the same direction as used for the planar object) and computes a gradient for each pixel. The construction module 86 then maps the determined planar objects to the image frame and compares the computed gradients. For example, if the gradient of the of the pixels in the image frame matches the gradient of intensity from the lidar frame, then planar points 97 are selected from the planar object for use in calibration.

The calibration module 88 receives the planar points 97 defining the planar object and generates calibrations 98 for calibrating the camera system 102 based on the planar points 97. For example, the calibration module 88 is configured to implement Zhang's method for computing camera parameters such as principal points, focus, and lens distortion using the planar points 97 of the planar object. As can be appreciated, other methods of calibrating the camera system 102 can be implemented in various embodiments.

Figure 6:
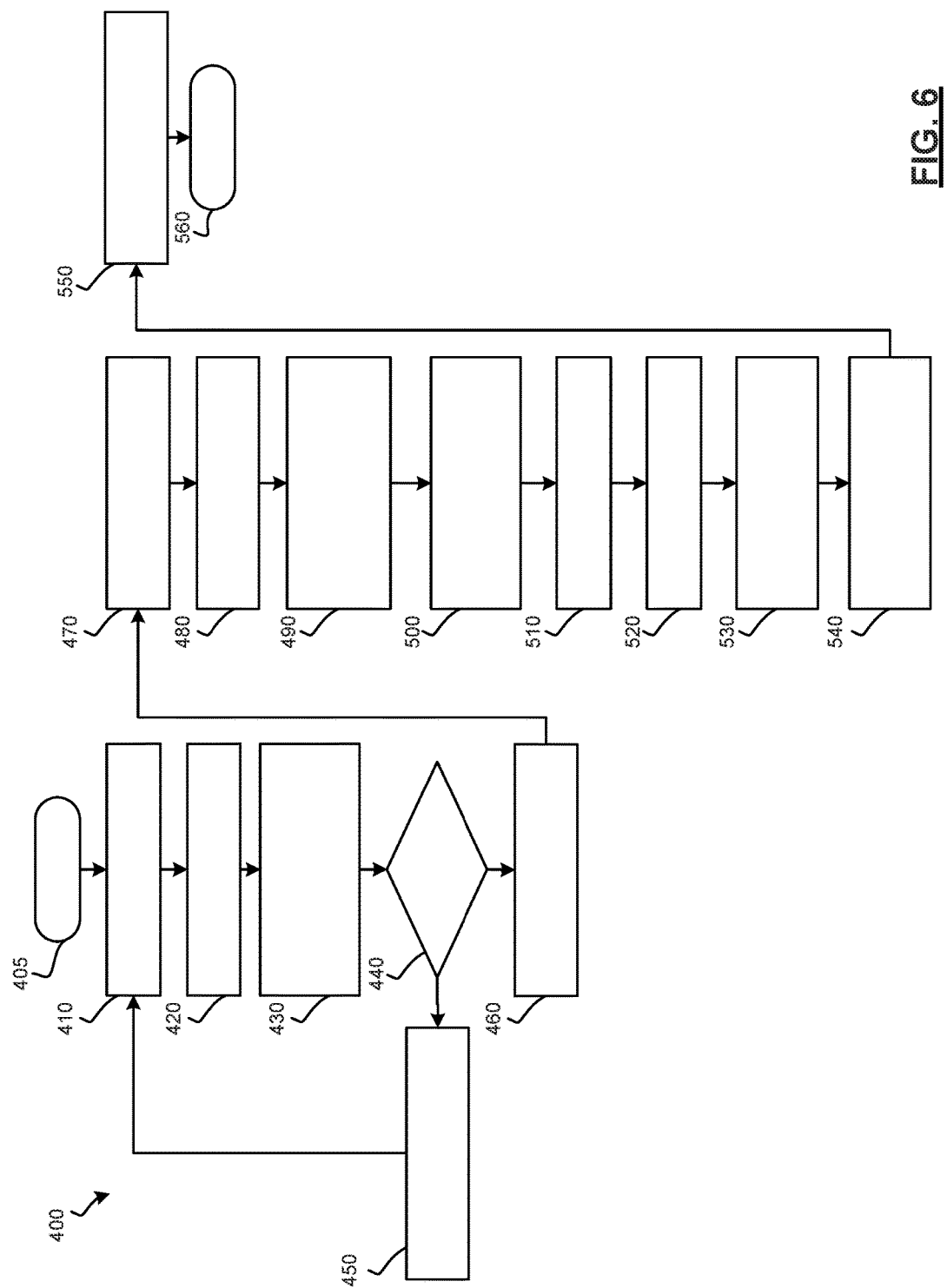
FIG. 6 is a flowchart illustrating a control method for detecting and recalibrating an image sensor and controlling the autonomous vehicle based thereon, in accordance with various embodiments.

Referring now to FIG. 6, and with continued reference to FIGS. 1-4, a flowchart illustrates a control method 400 that can be performed by the camera calibration system 100 of FIGS. 1 and 4 in accordance with the present disclosure. As can be appreciated in light of the disclosure, the order of operation within the method is not limited to the sequential execution as illustrated in FIG. 6, but may be performed in one or more varying orders as applicable and in accordance with the present disclosure. In various embodiments, the method 400 can be scheduled to run based on one or more predetermined events, and/or can run continuously during operation of the autonomous vehicle 10.

In one example, the method may begin at 405. The image data 90 is received and processed for discontinuities, for example, as discussed above, at 410. The lidar data 92 is received and processed for discontinuities, for example, as discussed above, at 420. The image discontinuities and the lidar discontinuities are mapped and the values compared for deviations, for example, as discussed above, at 430. If deviations between the mapped discontinuities are not greater than a threshold at 440, then the calibration status 94 is set to calibrated at 450. If, however, the deviations between the mapped discontinuities are greater than a threshold at 440, then the calibration status 94 is set to uncalibrated at 460, and the method continues with constructing the planar image in realtime at 470-540, and calibrating the camera system 102 based on the constructed planar image at 550.

For example, at 470, the three dimensional (3D) planar like mesh is constructed from the lidar data 95, for example, as discussed above. The gradient values are computed for the 3D planar like mesh at 480. The gradient values are then used to identify planar objects having a consistent changes or a pattern, for example, as discussed above, at 490. The identified patterned planar objects are then updated using one or more data enhancing techniques, for example, as discussed above, at 500.

The gradient values are computed from the image data at 510. The determined planar objects are then mapped to the image frame at 520. The computed gradients of the planar object and the image frame are then compared for matches. When matches exist, then planar points 97 are selected from the image frame and the planar object for use in calibration at 540.

The camera system 102 is then calibrated using the planar points 97 as the checkerboard in, for example, Zhang's method of calibration at 550. Thereafter, the method may end at 560.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A computer implemented method of calibrating a camera system of an autonomous vehicle, comprising:
   identifying, by a processor, a planar object from sensor data generated by a sensor of the autonomous vehicle while the autonomous vehicle is operating;
   identifying, by the processor, a grid-like pattern presented by the planar object based on gradient values computed from the sensor data;
   selecting, by the processor, planar points from the pattern of the planar object; and calibrating, by the processor, the camera system, while the autonomous vehicle is operating, based on the planar points.

2. The method of claim 1, wherein the sensor data includes lidar data.

3. The method of claim 2, wherein the identifying the pattern is based on gradient values computed from points of the lidar data.

4. The method of claim 1, wherein the sensor data includes image data.

5. The method of claim 4, further comprising:
computing gradient values for pixels in the image data; and
selecting the planar points based on gradient values in the image data.

6. The method of claim 1, wherein the identifying the pattern is based on gradient values computed from points of lidar data and image data.

7. The method of claim 1, further comprising filling holes of the pattern based on at least one data enhancing technique.

8. The method of claim 7, wherein the data enhancing technique includes anti-aliasing.

9. The method of claim 7, wherein the data enhancing technique is based on a predefined three dimensional map.

10. A computer implemented system for calibrating a camera system of an autonomous vehicle, comprising:
a first non-transitory module that, by a processor, identifies a planar object from sensor data generated by a sensor of the autonomous vehicle while the autonomous vehicle is operating;
a second non-transitory module that, by the processor, identifies a grid-like pattern presented by the planar object based on gradient values computed from the sensor data, and selects planar points from the pattern of the planar object; and
a third non-transitory module that, by the processor, calibrates the camera system, while the autonomous vehicle is operating, based on the planar points.

11. The system of claim 10, wherein the sensor data includes lidar data.

12. The system of claim 11, wherein the second non-transitory module identifies the pattern based on gradient values computed from points of the lidar data.

13. The system of claim 10, wherein the sensor data includes image data and lidar data.

14. The system of claim 13, wherein the second non-transitory module computes gradient values for pixels in the image data, and selects the planar points based on the gradient values in the image data.

15. The system of claim 10, wherein the second non-transitory module identifies the pattern is based on gradient values computed from points of lidar data.

16. The system of claim 10, the second non-transitory module fills holes of the pattern based on at least one data enhancing technique.

17. The system of claim 16, wherein the data enhancing technique includes anti-aliasing.

18. The system of claim 16, wherein the data enhancing technique is based on a predefined three dimensional map of the world.

19. A vehicle, comprising:
a lidar system;
a camera system; and
a controller configured to, by a processor, identify a planar object from sensor data generated by the lidar system of the autonomous vehicle while the autonomous vehicle is operating, identify a grid-like pattern presented by the planar object based on gradient values computed from the sensor data, select planar points from the pattern of the planar object, and calibrate the camera system, while the autonomous vehicle is operating, based on the planar points.

* * * * *